Dec. 17, 1935.  L. A. WATTERS  2,024,556
DEVICE FOR DELIVERING ADHESIVE TAPE FOR SEALING OF PACKAGES
Filed Feb. 3, 1928     2 Sheets-Sheet 1
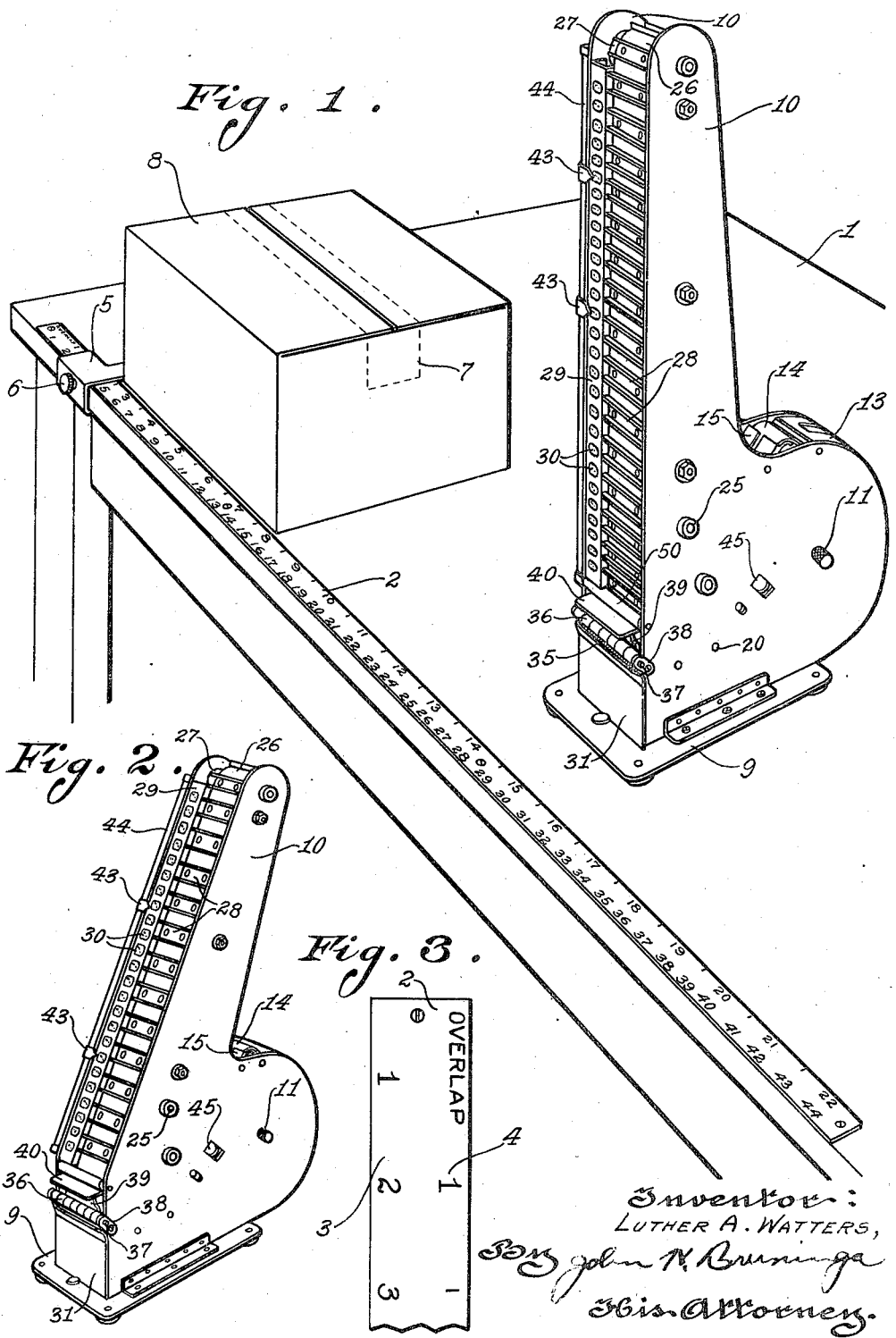

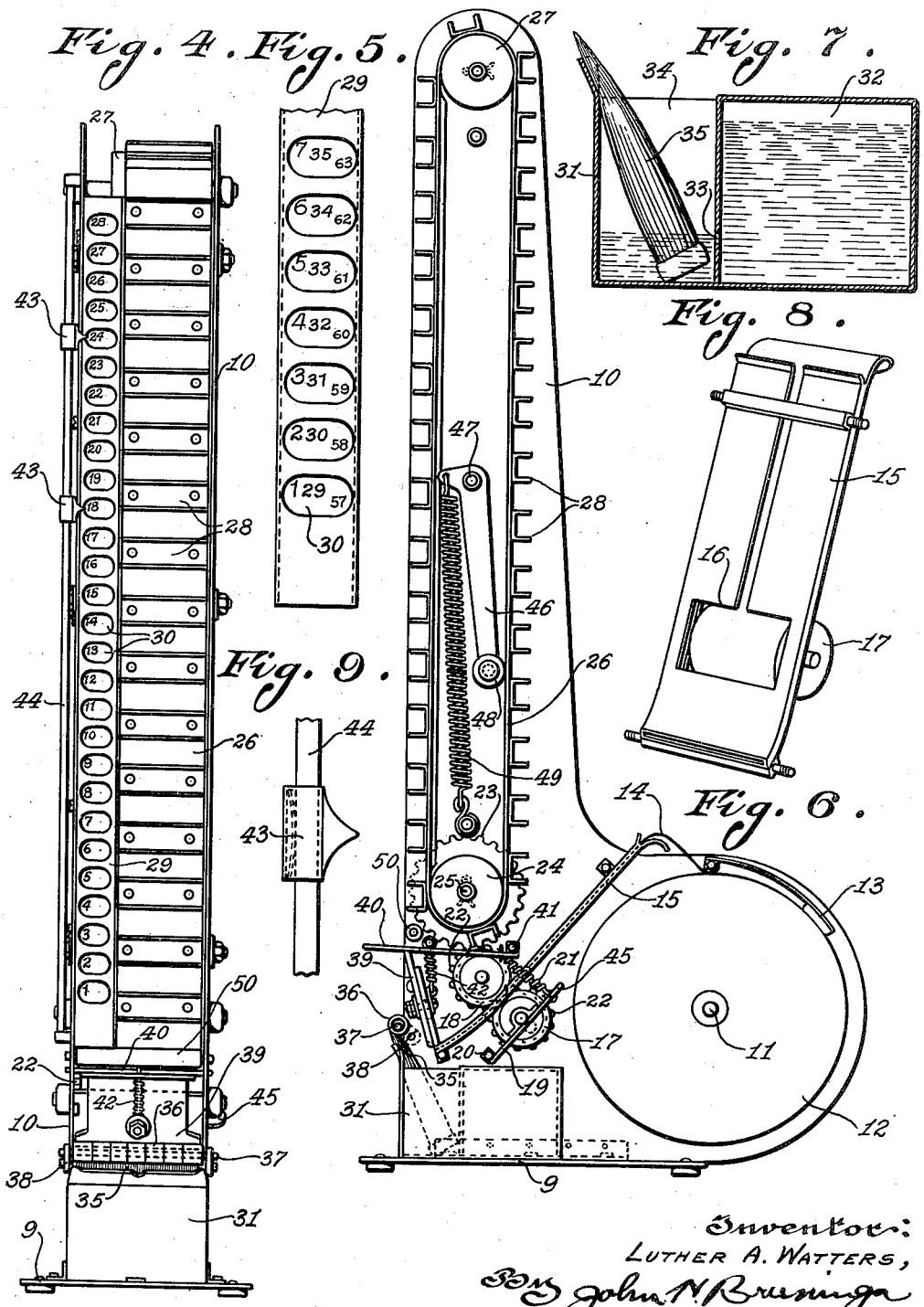

Patented Dec. 17, 1935

2,024,556

UNITED STATES PATENT OFFICE 2,024,556

DEVICE FOR DELIVERING ADHESIVE TAPE FOR SEALING OF PACKAGES

Luther A. Watters, Pearl, Ill.

Application February 3, 1928, Serial No. 251,513

15 Claims. (Cl. 164—42)

This invention pertains to machines for delivering gummed strips for the purpose of sealing packages and the like. More particularly, it pertains to means for measuring off and delivering a proper length of tape for securing a package of any particular size.

In accordance with the modern practice of shipping merchandise, goods are packed in boxes or containers made of cardboard or similar material, which, after being closed, are secured and sealed by pasting tape or paper or similar material over those parts of the box which are to be held together for closing or sealing the same. In most shipping departments, packages of a variety of different sizes must be handled and, accordingly, strips of tape of different length must be used for securing the packages.

One of the objects of this invention is to provide means whereby the packer may quickly determine the length of tape required and quickly measure off and cut the exact length of tape and which will deliver the tape properly gummed and moistened ready for application to the package.

Another object of this invention is to provide such means whereby these operations may be carried out with increased rapidity and greater convenience of manipulation, in order that time may be saved in the packing operation.

In most tape-delivering machines at present in use, there is frequent liability that the gummed side of the tape is not properly moistened, being either too wet or too dry, so that in either case the tape is not securely attached to the package. Accordingly, there is danger of its breaking away and permitting the package to open, with the consequent danger of loss or damage to the contents.

Another object of this invention, therefore, is to provide such a device which will not only measure and cut off the proper length of tape, but which will moisten the tape uniformly and to just the right consistency.

Another object is to make such a machine which is simple in construction and cheap to manufacture, portable and durable in service.

Further objects will appear from the following description, taken in connection with the accompanying drawings, in which—

Figure 1 is a perspective view, showing means for determining and measuring the proper length of tape in accordance with this invention;

Figure 2 is a similar view, on a reduced scale, of a tape-delivering device, showing another embodiment.

Figure 3 is an enlarged view of one end of the rule used for determining the length of tape;

Figure 4 is a front view of the machine shown in Figure 1;

Figure 5 is an enlarged detail of the indicator plate of Figure 4;

Figure 6 is a side view of Figure 4, with the side plate removed;

Figure 7 is a detail of the moistening pan.

Figure 8 is a perspective detail of the tape guide; and

Figure 9 is a detail of the indicator for standard lengths of tape.

Referring to the drawings, 1 designates the packer's table. In accordance with this invention, a rule 2 is provided, having a normal scale 3 of inches or other suitable units and an overlap scale 4, in which the units are double the length of those of the scale 3. A sliding stop 5 may be mounted on the rule 2 and provided with a set screw 6 or other similar fastening for securing the stop in adjusted position.

In the use of this portion of the device, the rule is fixed to the table 1 along the edge thereof, as shown, and the stop 5 is set to indicate on the overlap scale 4 the number of inches that the tape is to overlap the edge of the box. This overlap is indicated in Figure 1 at 7. The scale 4 is constructed with units of double length, so as to make allowance for the double overlap; that is, an equal overlap on each end. For instance, if the packer wishes to allow two and one-half inches overlap on each end, he sets the stop 5 at the 2½ indication on the scale 4. This will automatically set off on the scale 3 a length of five inches, thereby allowing for two overlaps of two and one-half inches each. The package 8 is then placed on the table along the rule 2, as indicated in Figure 1. The reading at the edge of the package, taken on the scale 3, then gives the length of tape required—as indicated in Figure 1, fifteen inches, which includes ten inches for the length of the box and two and one-half inches overlap at each end. Knowing the required length of tape, the packer may proceed to measure and cut off the required length.

The tape-delivering device comprises a base 9, upon which are mounted upright side plates 10. Mounted in the side plates 10 is a shaft 11 adapted to receive a reel 12 of gummed paper or the like. A brake 13 of any suitable type may be provided to prevent the reel from overrunning. The tape 14 passes from the reel 12 through a tape guide 15. The guide 15 is provided with a window 16, into which two feeding rolls 17 and 18 are adapted to project on opposite sides. One of these rolls 17 may be mounted on a bracket 19 pivoted at 20 on the side plates 10 and tensioned by a spring 21, so as to hold the same in engagement with the tape. The rolls 17 and 18 are connected by intermeshing gears 22, which will insure both rolls moving at the same rate.

Meshing with the upper one of the gears 22 is a gear 23 fixed to a drum 24 rotating on a shaft 25 mounted in the side plates 10. An endless band 26 passes over the drum 24 and a similar drum 27 mounted at the top of the plates 10. This drum has attached thereto at regular intervals manipulative elements 28 in the form of channel shape pieces. The width of the channels and the spacing between the elements is such that the flanges will be substantially uniformly spaced along the band. By grasping one of the elements 28 at the front of the machine and pulling the same downwardly, the operator causes the drum 24 to rotate, which in turn acts through the gears 23 and 22 to drive the rolls 17 and 18, thereby feeding the tape 14 from the reel. Located beside the band 26 in a vertical position is an indicator plate 29, having mounted thereon in appropriate positions opposite the various manipulative elements 28 a series of indicating plates or tags 30. These tags bear a series of numbers progressively arranged from bottom to top. The left-hand row of numbers runs consecutively from 1 to, say, 28. The second row, beginning with 29, runs upwardly to, say 56; while the third row, beginning at 57, runs consecutively upwardly in the same manner. The spacing of the tags 30 is the same as that of the flanges on the elements 28, so that each tag indicates the distance of a corresponding flange from the bottom position.

A stop 50 is located at the bottom point of the band 26. This stop has the form of a roller or bar and is placed so that the operator's hand will engage the same at the end of the movement of the band, so as to arrest that movement always at the same final position.

The ratio of the gearing 22 and 23 is such that a movement of the band 26 from one indicator plate 29 to the next will cause one inch of tape to be fed from the reel. Accordingly, by placing the fingers in contact with a manipulative element 28 opposite any given number—for instance, 20—on the indicator plate and moving the band downwardly until said element reaches the bottom, will cause 20 inches of tape to be fed from the reel.

Placed just below the tape guide 15 is a fount 31 adapted to hold a quantity of water or other liquid. This fount is constructed to have two compartments, one a storage compartment 32, which is air tight, except for an opening 33 in the lower portion thereof leading to the second compartment 34. Liquid placed in the compartment 32 will run out of the opening 33 into the compartment 34 until the level of liquid in the latter compartment rises so as to close the opening 33, after which no further rise will take place. As the liquid in the compartment 34 is used and its level drops, bubbles of air will pass through the opening 33 into the compartment 32, thereby permitting more liquid to run out. In this way the level of the liquid in the compartment 34 is kept constant. A capillary element, in the form of a brush 35, is loosely placed in the compartment 34 so as to dip into the liquid and rest at its upper edge against the upper edge of the compartment. This capillary element serves to raise the liquid to a point where it may be applied to the tape. The lower end of the tape guide 15 is placed so that tape emerging therefrom will be forced against the brush 35, so that its gummed side will be wiped against the brush. A series of short rollers 36, loosely mounted on a bar 37 supported by brackets 38 on the side plates 10 are arranged to bear upon the upper side of the tape as it passes the moistening element 35. These rollers have sufficient weight to hold the tape in uniform engagement with the moistening brush throughout its width, so that the moisture will be applied uniformly to the entire width of the tape.

Positioned at the end of the tape guide 15 is a cutter 39 slidably mounted in the side plates 10 and operated by a manipulative element 40 pivoted at 41 and tensioned by a spring 42. When the proper length of tape has been measured off and fed from the reel, the element 40 may be depressed so as to move the cutter 39 downwardly so as to sever the tape.

In the use of this machine, the operator having determined the proper length of tape, places his hand upon the element 28 opposite that length of tape as indicated on the indicator plate 29. He then moves his hand and the element 29 downwardly to its lowermost position, or until it engages the stop 50. This moves the band 26 so as to rotate the gear 23, thereby driving the feeding rolls 17 and 18 to feed the corresponding length of tape from the reel. As the tape is fed from the reel, it is thoroughly moistened by the brush 35. Upon completion of the feeding movement, the operator's hand is in position to immediately engage the manipulative element 40 to operate the cutter to sever the tape. In fact, these two motions may easily be one continuous movement. The machine is then immediately in a position for the repetition of this operation for delivering any desired length of tape. If a length greater than represented by the maximum height of the machine is desired, the required length may be found in the second row of figures. The operator then places his hand on the manipulative element 28 corresponding to the figure required, say, 34, moves his hand from this point to the bottom, then immediately grasps the topmost element 28 and again moves his hand to the bottom, after which he operates the cutter to sever the tape. In this way a length greater than represented by the maximum height of the machine can easily be measured off. The third row of figures on the tags 30 may be used in the same manner, except that two strokes, the full length of the machine, will be made in this case. Where standard lengths of tape are used frequently, indicators 43 mounted for adjustment on the slide 44 along the indicator plate 29 may be set at the standard lengths, so that the operator may quickly pick out these standard lengths.

In order to take up any possible wear or stretch in the band 26 or the drums 27, a take-up device, such as shown in Figure 6, may be provided. This consists simply of an arm 46 pivoted at 47 and carrying a roller 48 and which bears against the belt to keep the same taut. The arm 46 may be tensioned by a spring 49, as shown.

It will be seen that this invention provides means for greatly facilitating the packing operation. A package of any dimensions may be placed opposite the rule 2, its length quickly determined, and the required length of tape quickly delivered by the delivering device. This length is then applied in the position desired. If more than one opening or edge of the box is to be covered with tape, it may be turned from one position to another, so that each dimension is measured and the corresponding length of tape indicated on the rule 2. Since the level of liquid is kept constant in the water fount 31 and the capillary element 35 represents a constant height of lift above that level, a uniform quantity of water will always be carried in the element 35, so that the tape will always be moistened to the same extent. This is important for the reason that, if the tape is either too wet or too dry, its adhesive properties are impaired, and the liability of the package being opened accidentally is increased. The arrangement of the rule 2, together with the quickness of delivery by the delivering device, makes it possible to greatly increase the speed of operation in sealing packages.

As it is customary, when closing operations at night, to remove the tape from the guide 15, the same may be accomplished by simply drawing it upwardly from the guide. The bracket 19 is provided with a finger-piece 45 projecting through one of the side plates 10, so that this roll may be depressed against the tension of the spring 21 when the tape is to be reinserted in the tape guide 15.

While the device has been described as a complete combination, it will be understood, of course, that parts or sub-combinations may be useful without reference to other parts or sub-combinations, and the use of such combinations is contemplated by the invention. It is further obvious that various changes may be made, within the scope of the appended claims, in the details of construction without departing from the spirit of the invention; it is to be understood, therefore, that this invention is not limited to the specific details shown and described.

Having thus described the invention, what is claimed is:

1. A tape-delivering device, comprising, means for feeding the tape, and actuating means for said feeding means including a series of manipulatable elements progressively spaced from and movable to a definite position, whereby said feeding means may be actuated to dispense a length of tape in accordance with the movement of any of said elements.

2. A tape-delivering device, comprising, means for feeding the tape, actuating means including a movable band having a series of manipulatable elements spaced therealong, and operating connections between said actuating means and said feeding means whereby to feed a length of tape in accordance with the element manipulated.

3. In a tape serving device, tape advancing means including a member movable in a circuitous path, said path having a rectilinear portion of substantial length, said member being exposed for manipulation along the rectilinear portion of the path.

4. In a tape serving device, tape advancing means including a member movable in one direction thru a closed path having a straight portion of substantial length along which the member is exposed for manipulation, and a stationary gauge adjacent said straight portion for indicating length of tape dispensed upon movement of said member.

5. In a tape serving device, tape advancing means including a member movable in one direction thru a closed path having a straight portion of substantial length along which the member is exposed for manipulation, a series of manipulable elements along said member, and a stationary gauge adjacent said straight portion for indicating length of tape dispensed upon movement of a selected element to the end of said straight portion.

6. A tape-delivering device, comprising, means for feeding the tape, actuating means therefor including a movable band having an element thereon disposed for manipulation by an operator in a substantially vertical sweep of substantial length, and operating connections between said actuating means and said feeding means whereby to feed a length of tape in accordance with the movement of said band.

7. A tape-delivering device, comprising, means for feeding the tape, a series of progressively spaced elements manipulatable along a substantially straight path, means cooperating with said elements adapted to actuate said feeding means to deliver a length of tape corresponding to the element manipulated, a manipulatable actuator positioned in line with and adapted for actuation along said path, and a cutter operable by said actuator to sever the tape.

8. In combination with a tape-delivering device having means for feeding the tape and actuating means therefor including a manipulable element movable along a definite path for a distance corresponding to the length of tape fed; a length scale along said path having length indications corresponding to a length of tape fed greater than that fed by a single stroke of said manipulable element, said scale having an index fixing the terminal point for all measuring strokes.

9. In combination with a tape-delivering device having means for feeding the tape and actuating means therefor including a manipulable element movable along a definite path for a distance corresponding to the length of tape fed; a length scale along said path having length indications corresponding to a length of tape fed by different fractional strokes of said manipulable element, and additional indications corresponding to lengths greater than that fed by a single full stroke of said element, said scale having an index fixing the terminal point for all measuring strokes.

10. A tape-delivering device, comprising, means for feeding the tape, actuating means therefor including a series of manipulable elements progressively spaced from and movable to a definite position, whereby said feeding means may be actuated to dispense a length of tape in accordance with the movement of any of said elements, and a length scale having length indications opposite the normal positions of said elements, certain of said indications designating a length greater than the maximum stroke of said elements, said scale having an index fixing the terminal point for all measuring strokes.

11. In combination, a tape-delivering device having means for feeding the tape and actuating means therefor including a manipulable element movable along a definite path for a distance corresponding to the length of tape fed; a length scale along said path having length indications corresponding to a length of tape fed greater than that fed by a single stroke of said manipulable element, said scale having an index fixing the terminal point for all measuring strokes, and means for severing the tape at the end of a stroke.

12. In combination, a tape-delivering device having means for feeding the tape and actuating means therefor including a manipulable element movable along a definite path for a distance corresponding to the length of tape fed; a length scale along said path having length indications corresponding to a length of tape fed by different fractional strokes of said manipulable element, and additional indications corresponding to lengths greater than that fed by a single full stroke of said element whereby a length of tape greater than that fed by one full stroke may be measured off and fed, said scale having an index fixing the terminal point for all measuring strokes, and means for severing the measured length of tape at the end of a stroke.

13. A tape-delivering device, comprising, means for feeding the tape, actuating means therefor including a series of manipulable elements progressively spaced from and movable to a definite position, whereby said feeding means may be actuated to dispense a length of tape in accordance with the movement of any of said elements, a length scale having length indications opposite the normal positions of said elements, certain of said indications designating a length greater than the maximum stroke of said elements, whereby a length of tape greater than that fed by one full stroke may be measured off and fed, said scale having an index fixing the terminal point for all measuring strokes, and means for severing the measured length of tape at the end of a stroke.

14. In combination, a tape-delivering device having means for feeding the tape and actuating means therefor including a manipulable element movable along a definite path for a distance corresponding to the length of tape fed; a length scale along said path having length indications corresponding to a length of tape fed greater than that fed by a single stroke of said manipulable element.

15. In combination, a tape-delivering device having means for feeding the tape and actuating means therefor including a manipulable element movable along a definite path for a distance corresponding to the length of tape fed; a length scale along said path having length indications corresponding to a length of tape fed greater than that fed by a single stroke of said manipulable element, and means for severing the tape at an index point of said scale.

LUTHER A. WATTERS.